US010297160B1

(12) United States Patent
O'Leary (10) Patent No.: US 10,297,160 B1
(45) Date of Patent: May 21, 2019

(54) FLIGHT TIME COMPARATOR SYSTEM AND METHOD

(71) Applicant: Jet Advisors, LLC, Bedford, MA (US)

(72) Inventor: Kevin O'Leary, Bedford, MA (US)

(73) Assignee: Jet Advisors, LLC, Bedford, MA (US)

( * ) Notice: Subject to any disclaimer, the term of this patent is extended or adjusted under 35 U.S.C. 154(b) by 634 days.

(21) Appl. No.: 13/779,927

(22) Filed: Feb. 28, 2013

(51) Int. Cl.
| | |
|---|---|
| *G08G 5/00* | (2006.01) |
| *B64D 45/00* | (2006.01) |
| *G01S 13/88* | (2006.01) |
| *G01C 21/00* | (2006.01) |
| *G01C 23/00* | (2006.01) |
| *G01S 13/89* | (2006.01) |
| *H04W 4/02* | (2018.01) |

(52) U.S. Cl.
CPC .......... *G08G 5/0034* (2013.01); *B64D 45/00* (2013.01); *G01C 21/00* (2013.01); *G01C 23/00* (2013.01); *G01S 13/88* (2013.01); *G01S 13/89* (2013.01); *G08G 5/006* (2013.01); *G08G 5/0039* (2013.01); *G08G 5/0052* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 6,134,500 A * | 10/2000 | Tang | ..................... | G05D 1/0005 701/10 |
| 7,546,206 B1 * | 6/2009 | Miller | ..................... | G01C 21/00 701/120 |
| 7,720,630 B1 * | 5/2010 | Miller | ..................... | G01C 23/00 702/150 |
| 8,290,696 B1 * | 10/2012 | Sridhar | .................. | G08G 5/045 701/1 |
| 2005/0288973 A1 * | 12/2005 | Taylor | .................... | G06Q 50/14 705/5 |
| 2006/0271415 A1 * | 11/2006 | Simmons | ............... | G06Q 10/02 705/5 |
| 2007/0198170 A1 * | 8/2007 | Barry | ..................... | G06Q 99/00 701/120 |
| 2009/0094011 A1 * | 4/2009 | Griffin | ................. | G06Q 10/047 703/8 |
| 2010/0191458 A1 * | 7/2010 | Baker | .................... | G01C 21/00 701/533 |
| 2012/0010806 A1 * | 1/2012 | Tseng | ..................... | G01C 21/00 701/528 |
| 2012/0173204 A1 * | 7/2012 | Padmanabhan | ........ | G01C 15/00 703/1 |
| 2012/0218127 A1 * | 8/2012 | Kroen | ..................... | G01W 1/02 340/945 |
| 2013/0151291 A1 * | 6/2013 | Salway | ............... | G06Q 10/047 705/5 |

* cited by examiner

*Primary Examiner* — Gurkanwaljit Singh
(74) *Attorney, Agent, or Firm* — Bodi Law LLC

(57) ABSTRACT

A system and method operating on a computer system connected to one or more internal and external databases for statistical analysis of externally collected data of aircraft movements (AM Data) to develop business intelligence to understand, forecast and/or confirm aircraft transactions, market activity, usage patterns, industry trends, development of new business, products and procedures as well as verify the accuracy of invoices, flight records, flight/duty logs, flight time invoiced, airport enplanements/usage, geographic/in-state usage, regulatory/operational compliance and aircraft records when compared with AM Data combined with computed flight times.

29 Claims, 8 Drawing Sheets

| Date | Flight Log # | Pax | PIC | SIC | From | To | Out | Off | On | In | Block Time | Flight Time | FT Verified | Var | Duty Hours | Road Nights | Duty Days |
|---|---|---|---|---|---|---|---|---|---|---|---|---|---|---|---|---|---|
| 12/31 | 123 | 5 | MR | KS | KHPN | KPDK | 13:45 | 1353 | 1556 | 16:00 | 2.20 | 2 | 1.9 | 0.1 | 3.70 | 1.00 | 1.00 |
| 1/1 | 124 | 6 | MR | KS | KPDK | KGSP | 0350 | 0356 | 0422 | 0425 | 0.60 | 0.4 | 0.4 | 0 | 2.10 | 1.00 | 1.00 |
| 1/2 | 125 | 6 | MR | KS | KGSP | KHPN | 0255 | 0306 | 0428 | 0434 | 1.6 | 1.4 | 1.3 | 0.1 | 3.10 | 0.00 | 1.00 |
| Totals | | | | | | | | | | | 2.80 | 3.80 | 3.60 | 0.20 | 8.90 | 2.00 | 3.00 |

FIGURE 11

| Date | Flight # | Pax | From | To | Block Time | Flight Time | Target Flight | Var |
|---|---|---|---|---|---|---|---|---|
| 12/31 | 123 | 5 | KHPN | KPDK | 2.20 | 2.0 | 1.9 | 0.1 |
| 1/1 | 124 | 6 | KPDK | KGSP | 0.60 | 0.4 | 0.4 | 0 |
| 1/2 | 125 | 6 | KGSP | KHPN | 1.6 | 1.4 | 1.3 | 0.1 |
| Totals | | | | | 2.80 | 3.80 | 3.60 | 0.20 |

Figure 12

| Date | Flight # | Pax | From | To | Block Time | Flight Time | Target Type | Mean | Median | Var |
|---|---|---|---|---|---|---|---|---|---|---|
| 12/31 | 123 | 5 | KHPN | KPDK | 2.20 | 2.0 | 1.9 | | | 0.1 |
| Same Type | | | KHPN | KPDK | | | | 1.85 | 1.80 | 0.15 |
| Similar Aircraft | | | KHPN | KPDK | | | | 1.80 | 1.80 | 0.2 |

Figure 13

| Date | Reg # | Mean Pax | Mean Pax YtoY | Mean Pax Past Year | Pax VAR | Mean Dist | Mean Dist YtoY | Mean Dist Past Year | Dist VAR |
|---|---|---|---|---|---|---|---|---|---|
| Jan13 | N123 | 2.3 | 2.0 | 2.0 | 0.3 | 438.0 | 400.0 | 400.0 | 38.0 |

| South Carolina Annual In-State Flight Summary for 2012 | | | | | | | | | | | |
|---|---|---|---|---|---|---|---|---|---|---|---|
| Date | Reg # | Pax | Leg | From | To | Flight Time (FT) | FT Verified | In-State FT | Calendar Days | % Annual FT | Aircraft Value |
| 7/24 | N123 | 2 | A | GSO | NMB | 2.0 | 1.9 | 0.20 | 6.00 | | |
| 7/31 | N123 | 2 | A | NMB | GSO | 2 | 1.9 | 0.20 | 1.00 | | |
| 12/1 | N123 | 4 | B | GSO | CHS | 0.4 | 0.4 | 1.50 | 1.00 | | |
| 12/7 | N123 | 6 | C | CHS | GFS | 1.4 | 1.3 | 1.00 | 1.00 | | |
| 12/7 | N123 | 6 | D | GFS | GSO | 1.4 | 1.3 | 1.00 | 1.00 | | |
| Totals | | | | | | 7.20 | 6.80 | 1.00 | 10.00 | 0.05 | $ 1,100,000 |

Figure 15A

| Date | Airport | Total Departures | Total Enplanements |
|---|---|---|---|
| Jan13 | KBED | 10,000 | 23,000 |

Figure 16

| Date | Flight # | Pax | From | To | Block Time | Flight Time | Target Type | Mean | Median | Var |
|---|---|---|---|---|---|---|---|---|---|---|
| 12/31 | 123 | 5 | KHPN | KPDK | 2.20 | 2.0 | 1.9 | | | 0.1 |
| Same Type | | | KHPN | KPDK | | | | 1.85 | 1.80 | 0.15 |
| Similar Aircraft | | | KHPN | KPDK | | | | 1.80 | 1.80 | 0.2 |

FLIGHT TIME COMPARATOR SYSTEM AND METHOD

BACKGROUND

This application generally relates to a system and method for the analysis of aircraft flights, and more particularly relates to such analysis based upon externally collected data about aircraft movements (AM Data, as defined below).

Aircraft advisors/consultants have used flight computers to individually calculate the estimated flight times of an aircraft type to verify flight time and performance. There is no system that has been designed to use multiple databases to conduct statistical analysis of externally collected data of aircraft movements (AM Data) to develop business intelligence to understand, forecast and/or confirm aircraft transactions, market activity, usage patterns, development of new business, products and procedures, industry trends, as well as verify the accuracy of invoices, flight records, flight/duty logs, flight time invoiced, airport enplanements/usage, geographic/in-state usage, regulatory/operational compliance and aircraft records when compared with AM Data combined with computed flight times. It would be useful to provide a means of solving one or more of these problems.

SUMMARY

Provided are a plurality of example embodiments, including, but not limited to, a system and method for statistical analysis of externally collected data of aircraft movements (AM Data) to develop business intelligence to understand, forecast and/or confirm aircraft transactions, market activity, usage patterns, development of new business, industry trends, products and procedures as well as verify the accuracy of invoices, flight records, flight/duty logs, flight time invoiced, airport enplanements/usage, geographic/in-state usage, regulatory/operational compliance and aircraft records when compared with AM Data combined with computed flight times.

Also provided is a method of using a computer system for verifying aircraft flight information, said method comprising the steps of:

providing a user interface to said computer system for accepting specific or proposed flight information about a flight for a particular aircraft from a user;

retrieving aircraft information about the particular aircraft from a first database;

retrieving geographical and/or weather information about a route for the specific or proposed flight from a second database;

using at least one computer of said computer system for calculating derived flight information using said specific or proposed flight information, said aircraft information, and said geographical and/or weather information; and using at least one computer of said computer system for generating a report utilizing said derived information, wherein said report is output by said computer system.

Further provided is a method of using a computer system for verifying aircraft flight information, said method comprising the steps of:

providing a user interface to said computer system for accepting specific or proposed flight information about a flight for a particular aircraft from a user;

inputting reported and/or projected flight information about the flight;

retrieving historical information related to the specific or proposed flight from a database;

retrieving aircraft information about the particular aircraft from the database;

using at least one computer of said computer system for calculating derived flight information using said specific or proposed flight information and said aircraft information;

reconciling said derived information with said reported and/or projected flight information about the flight to identify discrepancies, and wherein said report includes information about said discrepancies; and using at least one computer of said computer system for generating a report utilizing said derived information, wherein said report is output by said computer system.

Still further provided is a method of using a computer system for verifying aircraft flight information, said method comprising the steps of:

providing a user interface to said computer system for accepting specific or proposed flight information about a flight for a particular aircraft from a user;

inputting reported and/or projected flight information about the flight;

retrieving historical information related to the specific or proposed flight from a database;

retrieving aircraft information about the particular aircraft from the database;

using at least one computer of said computer system for calculating derived flight information using said specific or proposed flight information, said historical information, and said aircraft information; and using at least one computer of said computer system for generating a report utilizing said derived information for comparing with said reported and/or projected flight information, wherein said report is output by said computer system. Also provided are additional example embodiments, some, but not all of which, are described hereinbelow in more detail.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Provided is a system and methodology for the analysis of externally collected data about aircraft movements (AM Data). Provided is the glossary below for a better understanding of the terminology utilized in describing this system and methodology.

Glossary

AM Data: AM Data includes, for example, externally collected and/or stored data about aircraft movements including but not limited to: Federal Aviation Administration (FAA), Air Traffic Control (ATC), satellite global positioning system (GPS), aircraft situation display to industry (ASDI), system wide information management (SWIM), ground surveillance or any other data sources for aircraft movement data (AM Data).

Flight Time Comparator (FTC): A system and methodology using, for example, a software program developed to conduct statistical analysis of externally collected and/or stored data of aircraft movements (AM Data) to develop business intelligence to understand, forecast and/or confirm aircraft transactions, market activity, usage patterns, industry trends, development of new business, products and procedures as well as verify the accuracy of invoices, flight records, flight/duty logs, flight time invoiced, airport enplanements/usage, geographic/in-state usage, regulatory/operational compliance and aircraft records when compared with AM Data combined with computed flight times.

ATC Data: This data is the record of actual flights taken as tracked by and obtained from the FAA Air Traffic Control system or any other method for tracking actual flights flown. ATC data is an example of data that can be used as actual flight information for evaluating and/or verifying reported flight information using the system.

Target Trip: The specific flight under investigation, which may be identified by a flight number, for example, identifying a particular aircraft and/or particular flight source/destination.

Same Trip: Trip on the same route with like kind aircraft type flown during the same season of any year. Since winds are seasonal, a search during the same season of a different year will be considered a Same Trip.

Target Aircraft: A specific aircraft (e.g., specific make and model).

Fuel/Technical Stops: Intermediate stops before the intended destination necessitated by regulation or aircraft performance.

Disclosed is at least one example embodiment of a Flight Time Comparator (FTC) method and system used to analyze AM Data, combined with related documents such as aircraft flight plans and passenger loads, and aircraft information about performance and capabilities of any particular aircraft (such as might be obtained from the manufacturer), among others, as a verification of a reported flight time and other parameters. These analyses would be used to verify reported aircraft information, which may include the information in aircraft flight logs, duty logs, pilot logs, invoices, aircraft records and/or flights over or within set geographic boundaries or time spent in certain geographic locations or airports (thereby supporting verification of geographical usage regulations, laws, or other requirements, such as appropriate payment of regional taxes). The example system will also calculate (derive) the estimated flight time based on aircraft performance, such as using algorithms combined with historic winds and other geographic and weather information. The example system will also check for aircraft information of similar flights of similar aircraft (e.g., Same Trip) for comparison of flight times and aircraft performance and to compare and verify documentation and reported information. The example system will also check for flight times of similar aircraft from nearby airports. The example system is designed to employ recorded or estimated (derived) flight times from available sources to verify, validate, substantiate or corroborate reported information such as past flight times under investigation or to forecast flight times for future flights or to find patterns in the data for business intelligence. The system can thus evaluate specific actual flights identified by specific flight information (e.g., a flight number, a flight category, flight date, or, e.g., a flight identified from a specific source airport to a specific destination airport and using a specific aircraft, which might be over a specific route), or it can evaluate proposed (hypothetical flights) for forecasting flights that might or maybe could occur.

Figure 1:
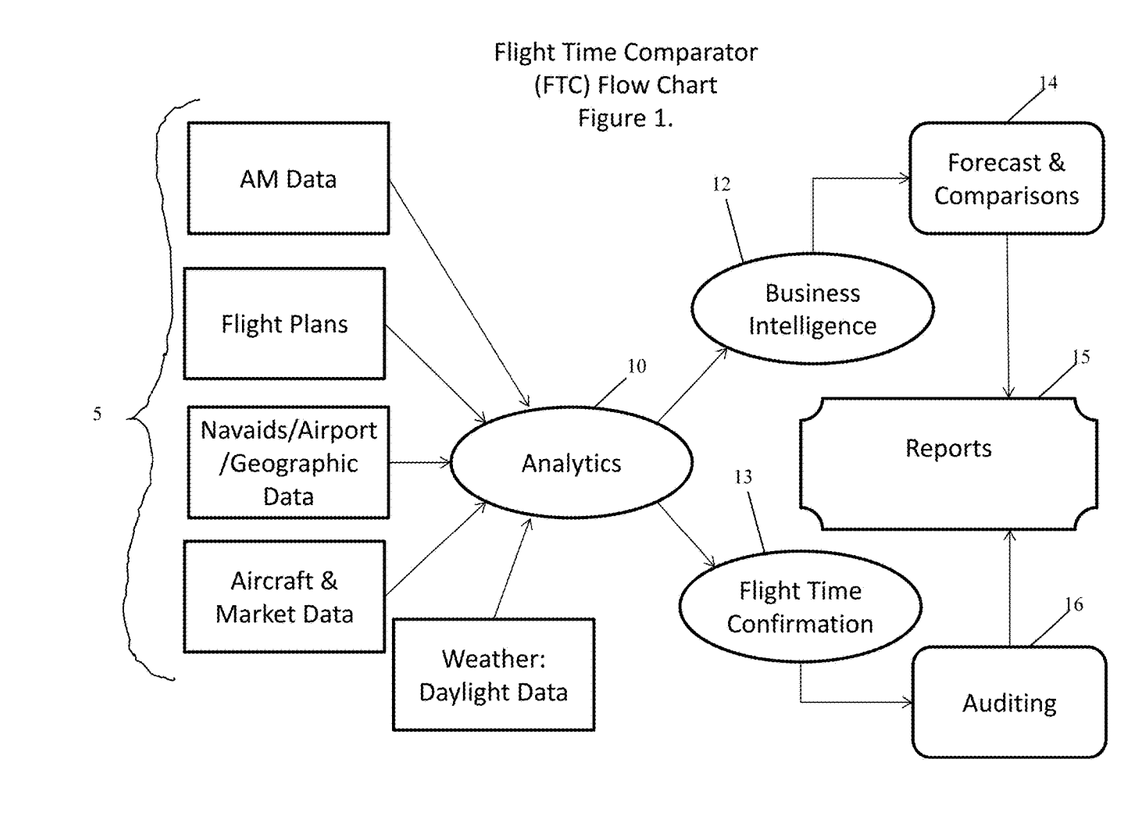
FIG. 1 is a flow chart showing the flow of data and processing of an example system.
Figure 1A:
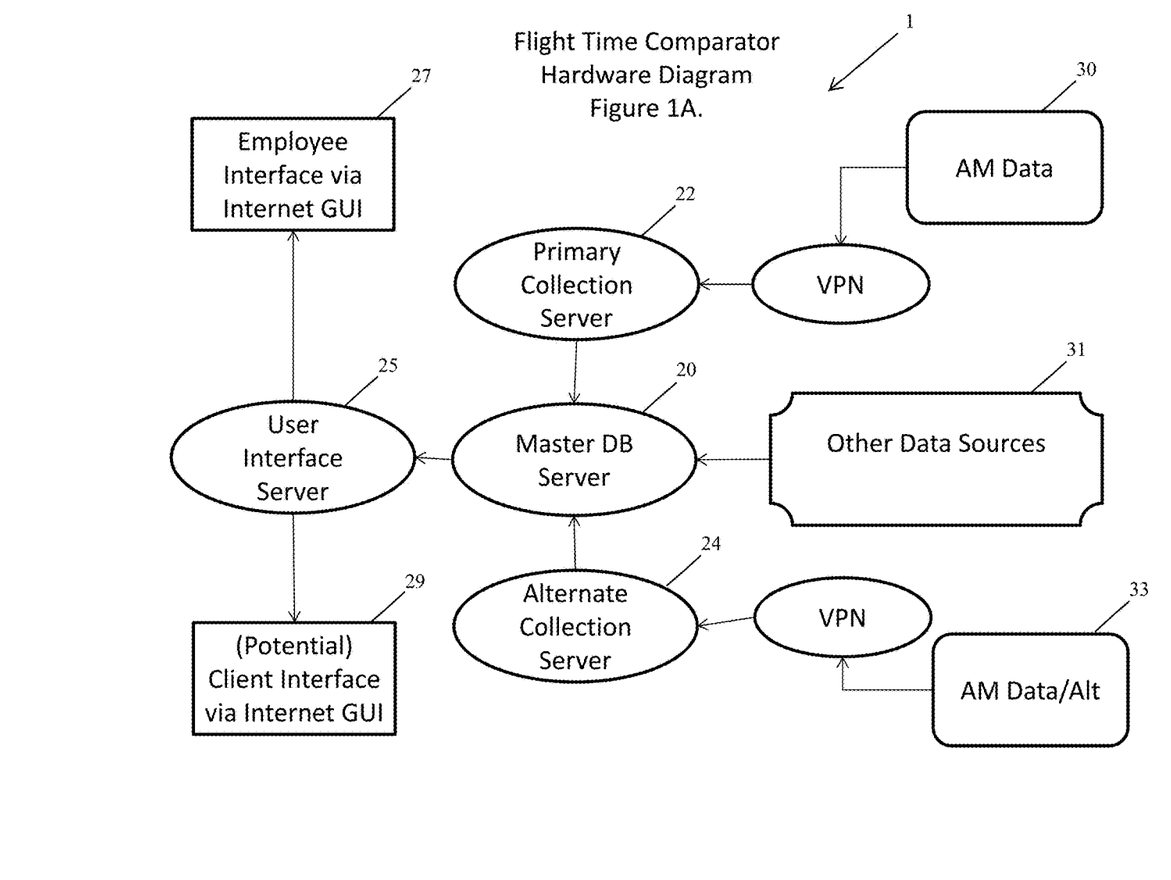
FIG. 1A shows a block diagram of an example hardware embodiment of the example system.

The Flight Time Comparator (FTC) of an example system is implemented by using one or more software programs executing on an example system 1 having a hardware design as shown in FIG. 1A comprising system servers including collection and database servers 20, 22, and 24, connected to a user interface server 25 for providing employee interface 27 and optionally providing client interface 29 (when providing clients with direct access to the system), utilizing the external AM Data database 30 and alternative database 33.

FIG. 1 provides a flow chart defining the primary functions of the programs executing on the hardware of FIG. 1A, with the programs designed to implement the functions of FIG. 1, i.e., to statistically analyze 10 the input data (including, but not limited to, using such methods as data mining, Bayesian, swarm theory, chaos theory, regression, multiple regression, t-tests, analysis of variance (anova), or multivariate analysis of variance (manova)). This analysis can be performed on any form of externally collected data 5 providing information about aircraft movements (AM Data) such as but not limited to: FAA, Air Traffic Control (ATC), satellite, global positioning system (GPS), aircraft situation display to industry (ASDI), system wide information management (SWIM), ground surveillance or any other data sources for AM Data. The FTC will also combine this data with any other applicable data 5 available (such as, but not limited to, passenger loads, aircraft performance data, airport data, navigational aids (navaids), approach and departure procedures, aircraft values, aircraft transactions, market data, industry trends, geographical information (cities of origin, geographical areas flown over and durations, airport locations, cities of destination, etc.), weather, and aviation procedures) to understand, forecast and/or confirm patterns, performance and usage/variations in usage of an aircraft, aircraft owner(s), aircraft type(s), categories or groups of aircraft or all aircraft. The resulting actionable business intelligence 12 will be used in the development of new procedures, business development, trend analysis, and product development (such as but not limited to new aircraft and aviation equipment). The analytical engine 10 will provide flight time confirmation 13 and generate reports 15 including forecasts and comparisons 14 and support for auditing activities 16. Such reports can be provided in the form of web presentations served by the system 1, electronic reports (e.g., Acrobat), paper reports, or some other formats.

The software for supporting implementing the methodology can be executed on the example system 1 servers and/or other computers comprising any suitable computerized device comprising a processing component (e.g., a processor) and a computer readable medium may be utilized for providing the example servers and remote terminals. Generally, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means. The computer readable medium may comprise, for example but not limited to, an electronic, magnetic, optical, electromagnetic, infrared, or semiconductor system, apparatus, device, database, or propagation medium. More specific examples of the computer readable medium would include, but are not limited to, a computer diskette, a hard disk, a random access memory (RAM), a read-only memory (ROM), an erasable programmable read-only memory (EPROM or Flash memory) which may be internal or external, permanent or removable, a compact disc read-only memory (CDROM) or random access memory (CDRAM), or any other tangible optical, electrical, magnetic, or other storage device; or storage found on transmission media such as those supporting the Internet or an intranet, including temporary cache memory.

The software is comprised of computer program code for carrying out operations of the example embodiments (e.g., for providing the applications used by the system servers) may be written by conventional means using any computer language, including but not limited to, an interpreted or event driven language such as BASIC, Lisp, VBA, or VBScript, or a GUI embodiment such as visual basic, a compiled programming language such as FORTRAN, COBOL, or Pascal, an object oriented, scripted or unscripted programming language such as Java, JavaScript, Perl, Smalltalk, C++, Object Pascal, or the like, artificial intelligence languages such as Prolog, a real-time embedded language such as Ada, or even more direct or simplified programming using ladder logic, an Assembler language, or directly programming using an appropriate machine language. For an example system, the Cent OS operating system and MSSQL and PostGRE SQL will be utilized. R will be used for data mining and statistical analysis The software executed by the system 1 comprises computer program instructions that are executed by being provided to (loaded in) an executing device or component, which can include a processor of a general purpose computer, a special purpose computer or controller, or other programmable data processing apparatus or component, such that the instructions of the computer program, when executed, create means for implementing the functions/acts specified in the flowchart and/or block diagram block or blocks. Hence, the computer program instructions are used to cause a series of operations to be performed on the executing device or component, or other programmable apparatus to produce a computer implemented process such that the instructions which execute on the computer or other programmable apparatus the steps for implementing the functions/acts specified in this disclosure. These steps or acts may be combined with operator or human implemented steps or acts and steps or acts provided by other components or apparatuses in order to carry out any number of example embodiments of the invention.

The flowcharts and/or block diagrams and/or the example screen shots provided in the drawings illustrate example architecture, functionality, and operation of possible implementations of systems, methods and computer program products according to various example embodiments of the present invention. In this regard, each block in a flowchart or block diagram may represent a module, segment, or portion of code that makes up the software, and thus which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Some of the uses of the system and methodology include, but are not limited to, using the FTC to generate output to further the understanding, forecasting, and/or confirm (derived or actual): aircraft performance, aircraft comparisons, flight log entries, flight charges, usage pattern & pattern variations, industry trends, geographic/in-state usage, invoices, fuel or technical stop requirements, enplanements, aircraft values and market data, and verify regulatory and other procedural compliance (such as compliance with FAA regulations, manufacturer procedures, airport procedures, maintenance procedures, etc.), among other uses. The system can use reported flight information that was reported by various personnel (pilots, maintenance personnel, managers, etc.) that can contain actual reported, recorded, or otherwise preserved flight information (logs, travel reports, start/stop/layover times, etc.) some of which may or may not be accurate, and that could, in at least some cases, be falsified or otherwise may be erroneous, The system can use projected flight information for a proposed or hypothetical flight(s) which is information like that of the reported flight information that is hypothetical, estimated, historical, or otherwise not based on an actual, specific flight. This information can be used to compare against corresponding information derived by the system to validate or invalidate the reported information, for example. The method could also be used to analyze usage trends such as longer trip or shorter trips becoming the norm to drive potential business opportunities in representing aircraft owners, whose usage indicates they need larger and/or longer range aircraft or smaller and/or shorter range aircraft.

The FTC, for additional verification of the AM Data; will also generate flight time estimates based upon internal algorithms and aircraft performance while adjusting for historic winds and even other weather phenomena. The flow charts of FIGS. 2-9, discussed below, are examples of calculations that the system 1 provides utilizing the AM data and data from the other internal and external databases to derive or otherwise calculate flight information for reporting to users of the system 1.

Figure 2:
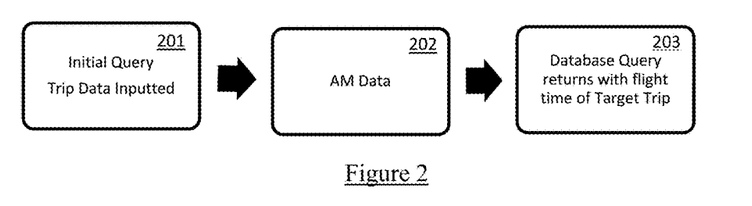
FIGS. 2-9 show flow charts of various example queries to which the system can respond.

FIG. 2 shows the steps taken for the identification of specific flight time information for the Target Trip in the AM Data on a specifically identified date and time for verification and further comparison. In this case, the initial query trip data for the flight time of a Target Trip is input 201 to the system, the AM Data is accessed 202, and the system returns the flight time of the Target Trip 203.

Figure 3:
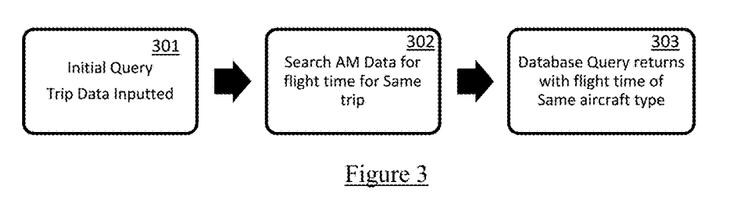

FIG. 3 shows the steps taken to compare the flight time from the Target Aircraft with the flight time on the same route of the same aircraft types (make and model) and note any differences. In this case the initial query trip data for the flight time of a Target Trip is input 301 to the system, the AM Data is searched for the Same Trip 302, and the system returns the flight times of a same aircraft type 303.

Figure 4:
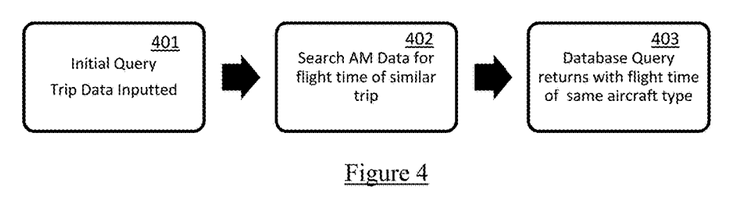

FIG. 4 shows the steps taken to compare the flight time from the Target Trip with the flight time of similar trips (departure airport and/or arrival airport in close proximity to Target Aircraft departure airport and/or arrival airport) on the same aircraft type (make and model) and note any differences. In this case the initial query trip data for the flight time of a Target Trip is input 401 to the system, the AM Data is searched for a similar trip 402, and the system returns the flight time of a same aircraft type 403.

Figure 5:
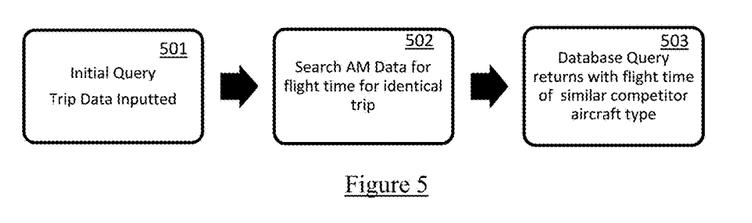

FIG. 5 shows the steps taken to compare the flight time from the Target Aircraft with the flight time of the Same Trip with an aircraft of similar size and performance capabilities (competitive aircraft). In this case the initial query trip data for the flight time of a Target Trip is input 501 to the system, the AM Data is searched for the Same Trip 502, and the system returns the flight time of a similar competitor aircraft type 503.

Figure 6:
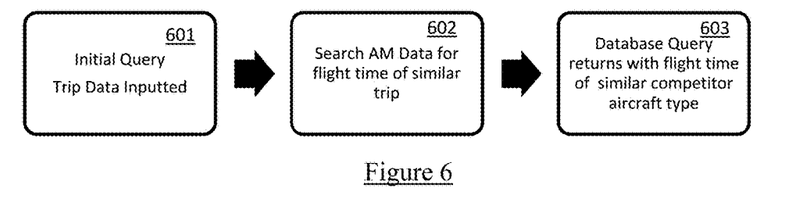

FIG. 6 shows the steps taken to compare the actual or reported flight time from the Target Aircraft with the flight time of a similar trip (departure airport and/or arrival airport in close proximity to Target Aircraft departure airport and/or arrival airport) with an aircraft of similar size and performance capabilities (competitive aircraft). In this case the initial query trip data for the flight time of a Target Trip is input 601 to the system, the AM Data is searched for a similar trip 602, and the system returns the flight time of a similar competitor aircraft type 603.

Figure 7:
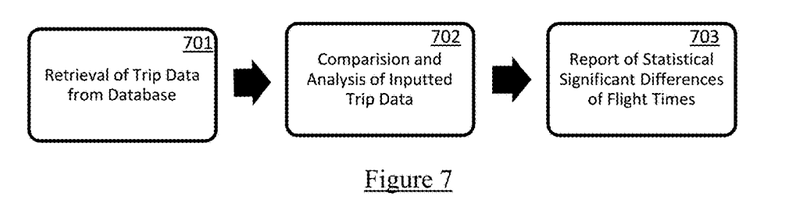

FIG. 7 shows the steps taken to compare all reported and/or actual data on flight times gathered in FIGS. 2-6 (i.e. flight time for same aircraft on same flights, flight time for same aircraft on similar flights, flight time for different (competitor) aircraft compared to Target Aircraft on Same Trips, and flight time for different (competitor) aircraft compared to Target Aircraft on similar flights), and highlight any statistically significant differences in the flight times. In this example case the database is searched 701, the AM Data is compared and analyzed for the Same Trip 702, and the system returns statistical significant differences of flight times 703.

Figure 8:
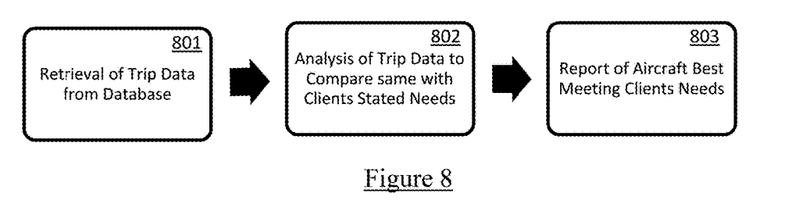

FIG. 8 shows the steps taken to compare all data on flight times gathered in FIGS. 2-6 (i.e. flight time for same aircraft on same flights, flight time for same aircraft on similar flights, flight time for different (competitor) aircraft compared to Target Aircraft on Same Trips, and flight time for different (competitor) aircraft compared to Target Aircraft on similar flights), and produce a listing of aircraft that best suits client's needs based on this historical information. In this case, the database is searched 801, the AM Data and derived historical data is compared and analyzed for comparison to clients' needs 802, and the system returns listing of best aircraft for clients' needs 803.

Figure 9:
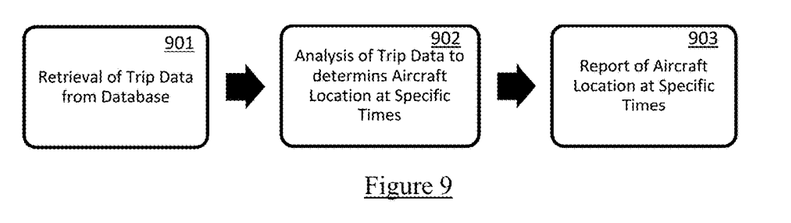

FIG. 9 shows the steps taken calculate the precise time aircraft spend in each geographic location (state or county) for auditing and reporting purposes. In this case the AM Data is searched 901, the AM Data is analyzed to determine specific aircraft exact geographic locations at specific times 902, and the system returns listing of aircraft location at specific times 903.

Figure 10:
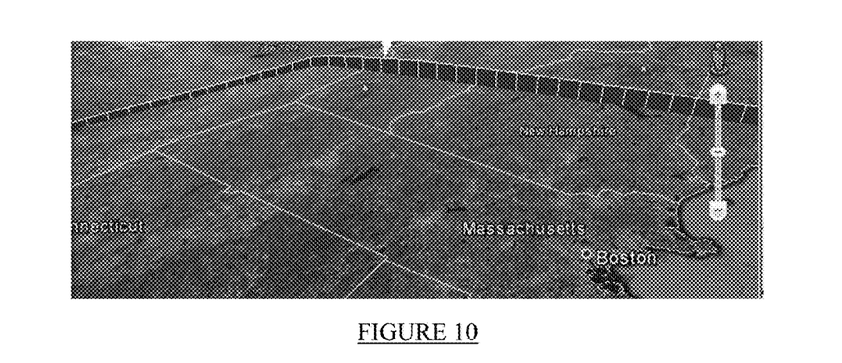
FIG. 10 shows a schematic of the climb performance of an example aircraft

Aircraft Performance:

Shown in FIG. 10 is a representation of the AM Data, combined with any other applicable data available, of the flight path of an aircraft departing a specific airport. This query will show how competitive aircraft perform (such as the climb shown in this figure) within certain airspace restrictions. This will be used to understand if better climb performance will be reduced or eliminated by Air Traffic Control limitations.

The tables of FIGS. 11-14, 15A, and 16-17 described below, show example calculation results that can be used and reported by the system in the practice of the disclosed methodology.

Figure 11:
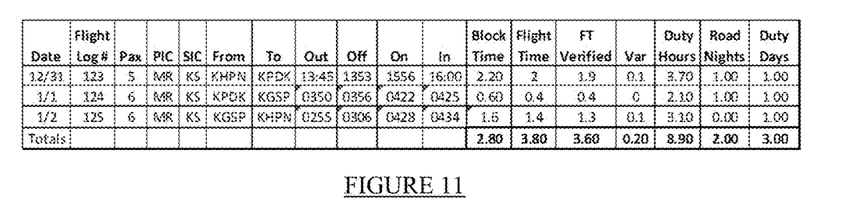
FIG. 11 shows example Log entries and the comparisons made to the AM Data and subsequent variations between the Flight Log as well as the road nights, duty hours and duty days calculated based on AM Data.

Flight Log Entries:

FIG. 11 shows a table with Flight Log entries and the comparisons made to the AM Data to verify flight time, subsequent variations between the Flight Log and AM Data as well as the road nights, duty hours and duty days calculated based on the AM Data.

Figure 12:
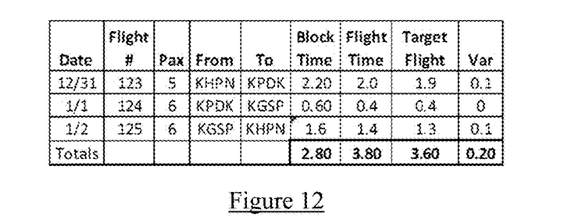
FIG. 12 shows example comparisons of AM Data with invoices and charges from a flight service provider.

Flight Charges:

As shown in FIG. 12, the FTC will compare the AM Data with invoices based on flight charges to find the Target Trip and analyze the variances, if any.

Figure 13:
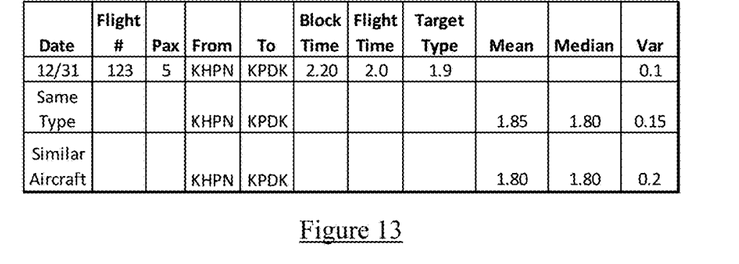
FIG. 13 shows an example trip comparison with the same aircraft type & comparable aircraft types on the same trip.

Aircraft Comparisons:

As shown in FIG. 13, the analysis will include statistical operations to compare same, similar or competitive aircraft types to validate (or invalidate) the findings. The FTC will also analyze the same & comparable types on the Same Trip and similar trips for comparison.

Figure 14:
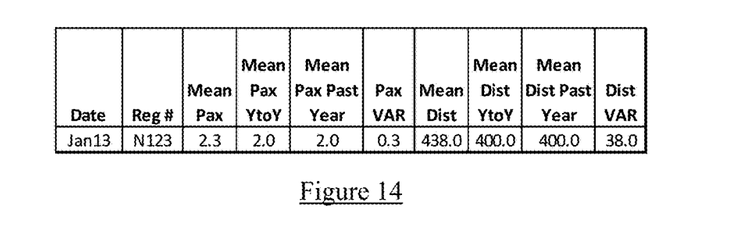
FIG. 14 shows example Usage Pattern Variations.

Usage Patterns & Pattern Variations:

As shown in FIG. 14, a table representing partial results from the analysis of travel patterns, airports used (or not used), regions frequented, and variations in these usage patterns is calculated. These patterns will be combined with transactional data to forecast changes in ownership among other things.

Figure 15:
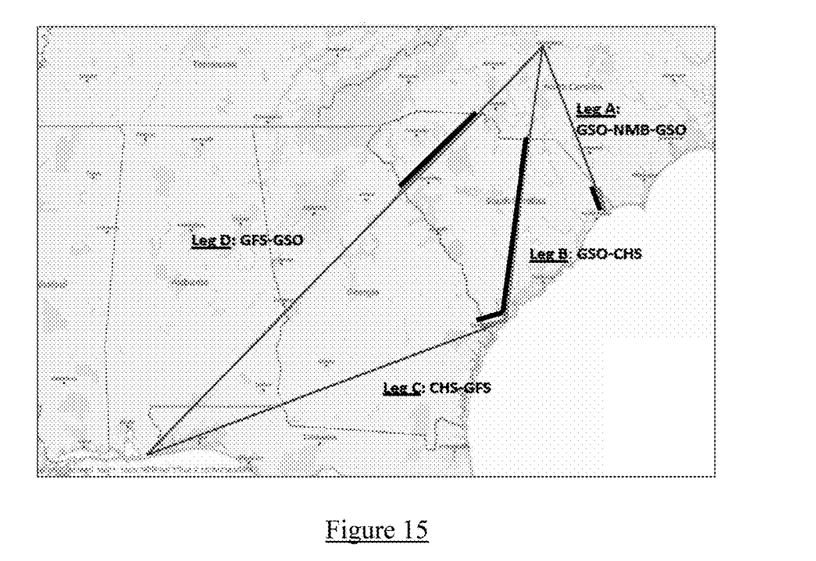
FIG. 15 shows a schematic of an example geographic usage within South Carolina.
Figure 15A:
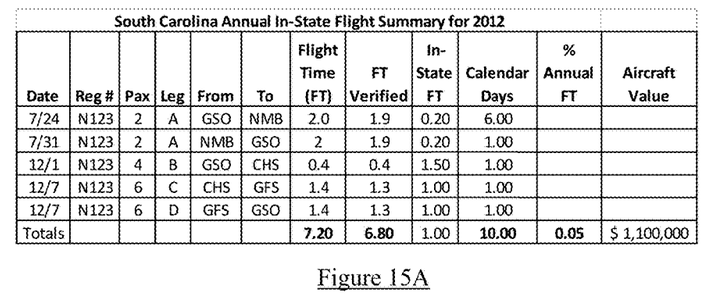
FIG. 15A shows an example table of In-State usage, In-state usage as a percentage of total annual usage and aircraft value.

Geographic/in-State/Airport Usage:

As shown in FIGS. 15 and 15A, by way of a graphic representation (FIG. 15) and a table (FIG. 15A) the flight time in and over a specific geographic area, calendar days within the geographic area, value of aircraft during the time in the geographic area, percentage of total annual usage of the aircraft and ground time within a certain geographic area, state or airport, such as within a state's boundaries. The graphic representation of FIG. 15 could be provided in a report or other display output by the system, where desired.

Figure 16:
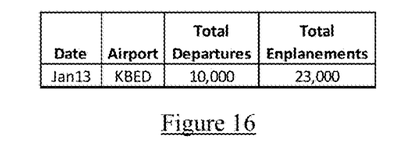
FIG. 16 shows an example table showing example enplanements.

Enplanements:

As shown in FIG. 16, a table is calculated showing data concerning a specific airports enplanements and passenger loads.

Figure 17:
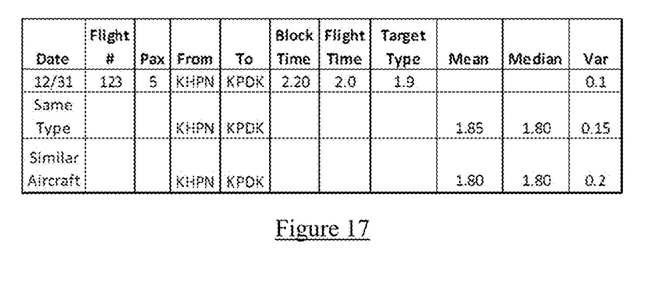
FIG. 17 shows an example of an invoice comparison table with AM Data for the Same Aircraft Type and Similar Aircraft Type.

Invoices:

As shown in FIG. 17, a table with data used to compare invoices that involve aircraft flight time and compare aircraft performance is also calculated.

Figure 18:
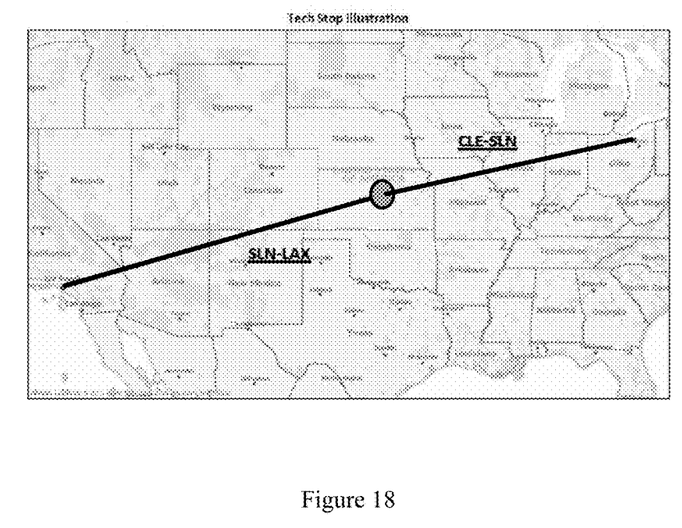
FIG. 18 shows a schematic example where the system uses logic to identify required stops such as a fuel or technical stop.

Fuel or Technical Stop Requirements:

As shown in FIG. 18, a graphic illustration of the results of analysis is shown, with the graphic prepared utilizing logic that will identify aircraft or aircraft types that are used on trips where the aircraft or aircraft type necessitated a fuel or technical stop to reach the intended destination.

Figure 19:
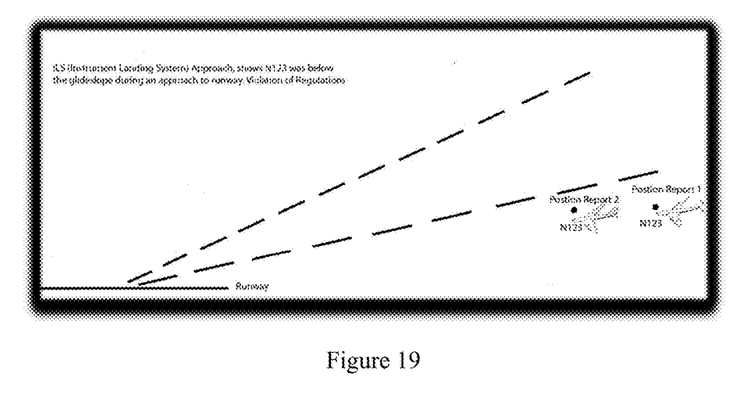
FIG. 19 shows a schematic example of an aircraft that was not in compliance with the regulations; the aircraft had two position reports below the Instrument Landing System's minimum altitude.

Operational or Regulatory Requirements:

As shown in FIG. 19, a graphic illustration representing the result of analysis to identify aircraft that may or may not be flown within defined requirements can be provided. The FTC's AM data will be combined with the data used by the FAA or other governing bodies, operators, or operations to define aviation procedures such as, but not limited to, proposed approaches, arrivals, departures, missed approaches, un-stabilized approaches, descent rates, minimum or maximum altitudes, airspace restrictions, crossing restrictions, aircraft limitations, vertical navigation, airport restrictions, course deviations, military operations areas and speed restrictions, obstacle clearance among other requirements and operating procedure adherence, and the system reporting can be tailored to support such uses. This methodology can also be used by manufacturers for product development and improvement purposes, and the reporting can be further tailored to support such uses. Additional data will include topographical and man-made obstacles that are pertinent to aviation operations. The example shows an aircraft that is required by regulations or company policy to be flying between the two dashed lines but was confirmed to be below the required minimum altitude prescribed for this approach to the runway. This would be an example of a violation of regulations or operational procedures. Hence, the system can be used to support determining compliance with legal or regulatory requirements, and can support proceedings to determine such compliance.

Aircraft Market Activity:

The FTC, for example, will also use AM Data combined with any other applicable data available, such as, but not limited to, Market Data, Transaction History, system historical data (derived, actual, or proposed), Accident Data, Global Production, etc. to understand, forecast, determine and analyze industry trends and proposals, and/or confirm the usage patterns of an aircraft, aircraft owner(s), aircraft type(s), categories and groupings of aircraft. The analysis will include, but not be limited to, trip speed, climb, cruise, descent, routes taken, trip lengths, regions frequented, fuel or technical stops, travel patterns, airports used (or not used), ATC influence, and variations in these usage patterns. The usage patterns will be analyzed and compared to historic/current patterns to forecast aircraft owners' activities such as but not limited to usage, transactions, market activity and aircraft values. This analysis will include statistical operations such as but not limited to data mining to validate the findings and confirm any differences in flight patterns by aircraft, aircraft type(s) and aircraft categories to create forecasting models.

Usage Example:

The Flight Time Comparator (FTC) is a software program or collection of programs, operating on associated computer hardware, designed to statistically analyze (including, but not limited to, such methods as data mining, Bayesian, swarm theory, chaos theory, regression, multiple regression, t-tests, analysis of variance (anova), or multivariate analysis of variance (manova)) any form of AM Data such as but not limited to: FAA, Air Traffic Control (ATC), satellite, global positioning system (GPS), aircraft situation display to industry (ASDI), system wide information management (SWIM), ground surveillance or any other data sources for AM Data. The FTC will also combine this data with any other applicable data available (such as, but not limited to, passenger loads, aircraft performance data, airport data, navigational aids (navaids), aircraft values, aircraft transactions, market data, weather, and aviation procedures) to understand, forecast and/or confirm patterns, and determine trends, performance and usage/variations in usage of an aircraft, aircraft owner(s), aircraft type(s), categories or groups of aircraft or all aircraft.

The system will also be used to calculate the precise time aircraft spend in both flight and on the ground in each geographic location (for example state or county or airport) for auditing and reporting purposes. The system will determine if flights occurred during day time or night time hours, for example. The system will display the actual route of flight in both the vertical and horizontal plane, such as by using graphical representations that can be displayed or otherwise reported, to understand performance differences within the ATC system. The system will employ flight plan data, if available, for passenger loads or estimated passenger loads based on domestic segment fees submitted, or utilizing any other means of determining the number of passengers onboard. The system will also combine aircraft value data with aircraft owner data, including contact information, to derive the information desired.

The AM Data will be collected and can be stored locally by the system, where desired, to enable such data to be used to analyze aircraft performance during an evaluation and verification process. The AM Data may also be used to compare the specific Target Aircraft's performance to an aircraft of like size and capabilities manufactured by a competing manufacturer, to allow for practical comparisons of different aircraft for evaluation by clients or even manufacturers, such as for new product development.

A first step of the data collection and analysis process can be the identification of specific flight information for the Target Trip in the AM Data on a specifically identified date and time for verification and further comparison using the process shown in the flow chart of FIG. 2.

Target Trip Example: Identifying a Specific Aircraft that Flew the Target Trip:

Initial Query: Target Trip departed Hanscom Field Airport (BED), Bedford, Mass. enroute to Miami International Airport (MIA), Miami at 3:00 pm EDT on Oct. 12, 2012. The specific aircraft was a Citation V Ultra. The FAA Registration Number may or may not be known.

Example Query Results (Calculated and Reported by the FTC):

NXXXX: Serial Number 560-XXXX Citation V Ultra departed (BED) for MIA at 9:00 am and arrived 2 hours 50 minutes later at 11:50 am. (Rejected as Target Trip. This was the wrong time of day to be used as the Target Trip);

NXXXX: Serial Number 560-XXXX Citation V Ultra departed (BED) for MIA at 3:00 pm and arrived 2 hours 55 minutes later at 5:55 pm. (Accepted as the Target Trip); and NXXXX: Serial Number 560-XXXX Citation V Ultra departed (BED) for MIA at 6:00 pm and arrived 2 hours 48 minutes later at 8:48 pm. (Rejected as Target Trip: This was the wrong time of day to be the Target Trip).

The second step of the data collection and analysis process is to compare the flight time from the Target Aircraft with the flight time of the Same Trip on the same aircraft type (make and model) and note any differences. The FTC software accomplishes this by searching for the Same Trips conducted by the same aircraft type (make and model) to compare those flight times with the Target Aircraft's flight time using the process shown in the flow chart of FIG. 3.

Example of a Same Trip on like aircraft: Hanscom Field Airport (BED), Bedford, Mass. to Miami International Airport (MIA), Miami, Fla. 13 Oct. 2012, Citation V Ultra FAA Registration Number NXXXX and Citation V Ultra FAA Registration Number NYYYY.

Example Query Results: Includes the Rejected Trips from First Query:

NXXXX: Serial Number 560-XXXX Citation V Ultra departed (BED) for MIA at 9:00 am and arrived 2 hours 50 minutes later at 11:50 am. (This was the wrong time of day to be the Target Trip).

NXXXX: Serial Number 560-XXXX Citation V Ultra departed (BED) for MIA at 6:00 pm and arrived 2 hours 48 minutes later at 8:48 pm. (Rejected as Target trip: This was the wrong time of day to be the Target Trip)

The third step of the data collection and analysis process is to compare the flight time from the Target Trip with the flight time of similar trips (departure airport and/or arrival airport in close proximity to Target Aircraft departure airport and/or arrival airport) on the same aircraft type (make and model) and note any differences. The FTC software accomplishes this by searching for the most similar trips on the same aircraft type (make and model) to compare those flight times with the Target Aircraft's flight time using the process shown in the flow chart of FIG. 4.

Target Trip: Flight time=2 hours 55 minutes.

Identical trip: Mean flight time=2 hours 49 minutes or (2 hours 48 minutes+2 hours 50 minutes divided by 2).

Since flight time varies due to many variables, the FTC system is designed to identify potential over-billings. In this example, there is a potential over-billing of 6 minutes or $\frac{1}{10}$th of one hour.

Example of a similar trip on like aircraft: Hanscom Field Airport (BED), Bedford, Mass. to Miami International Airport (MIA), Miami, Fla. 13 Oct. 2012, Citation V Ultra FAA Registration Number NXXXX and Logan International Aircraft (BOS), East Boston, Mass. to Miami International Airport (MIA), Miami, Fla. 13 Oct. 2012, Citation V Ultra FAA Registration Number NYYYY.

The fourth step of the data collection and analysis process is to compare the flight time from the Target Aircraft with the flight time of the Same Trip with an aircraft of similar size and performance capabilities manufactured by a competing manufacturer. The FTC software accomplishes this by searching for the Same Trips conducted by an aircraft of similar size and performance capabilities manufactured by a competing manufacturer to compare those flight times with the Target Aircraft's flight time using the process shown in the flow chart of FIG. 5.

Example of a Same Trip on similar aircraft: Hanscom Field Airport (BED), Bedford, Mass. to Miami International Airport (MIA), Miami, Fla. 13 Oct. 2012, Citation V Ultra FAA Registration Number NXXXX and Learjet 40 FAA Registration Number NZZZZ.

The fifth step of the data collection and analysis process is to compare the flight time of the Target Aircraft with the flight time of a similar trip (departure airport and/or arrival airport in close proximity to Target Aircraft departure airport and/or arrival airport) with an aircraft of similar size and performance capabilities manufactured by a competing manufacturer. The FTC software accomplishes this by searching for similar trips (departure airport and/or arrival airport in close proximity to Target Aircraft departure airport and/or arrival airport) conducted by an aircraft of similar size and performance capabilities manufactured by a competing manufacturer to compare those flight times with the Target Aircraft's flight time using the process shown in the flow chart of FIG. 6.

Example of a similar trip on similar aircraft: Hanscom Field Airport (BED), Bedford, Mass. to Miami International Airport (MIA), Miami, Fla. 13 Oct. 2012, Citation V Ultra FAA Registration Number NXXXX and Logan International Aircraft (BOS), East Boston, Mass. to Miami International Airport (MIA), Miami, Fla. 13 Oct. 2012, Learjet 40 FAA Registration Number NZZZZ.

The sixth step of the data collection and analysis process is to compare all data on flight times gathered in steps one through five (i.e. flight time for same aircraft on Same Trips, same aircraft on similar flights, different (competitor) aircraft compared to Target Aircraft on same flights and different (competitor) aircraft compared to Target Aircraft on similar flights) and highlight any statistical significant differences in the flight times using the process shown in the flow chart of FIG. 7.

The seventh step of the data collection and analysis process is to input all data gathered in steps one through six into a software analysis program that would take such data and compare same to a client's stated needs to determine the best aircraft type, make and model to comply with such stated needs using the process shown in the flow chart of FIG. 8.

The eighth step of the data collection and analysis process is to input all data gathered in steps two through six into a software analysis program that would compute the specific geographic location of the aircraft during a specific time period using the process shown in the flow chart of FIG. 9.

Finally, all of any of the calculated (derived) information and other information used by the system can be preserved in a database for preserving historical information that can be used for the trend and market analysis, among others, and for determining desired modifications, improvements, and other updates to routes, aircraft, airports, etc. based on the historical information and determined trends.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method of using a computer system comprising at least one computer and a database for verifying aircraft flight information, said method comprising the steps of:

storing historical information about a plurality of different flight routes for a plurality of different models of aircraft in a local database;

connecting the computer system to each one of a plurality of different external computer systems via a communication network;

the computer system executing instructions to obtain aircraft information about each one of the plurality of different models of aircraft, said aircraft information including aircraft size and performance information that is received electronically from a respective database of the external computer system of the respective manufacturer of each model of aircraft;

the computer system executing instructions to store said aircraft information in the local database;

the computer system executing instructions to provide a user interface with a display to display information to the user and having an input interface to said computer system to accept specific or proposed flight information about a target flight from the user;

selecting a target aircraft of a particular model from the plurality of different models of aircraft to evaluate the target flight;

the computer system executing instructions to search the local database to retrieve aircraft information about the target aircraft from the local database;

the computer system executing instructions to search the local database to retrieve respective aircraft information about one or more different aircraft models from the local database, said one or more different aircraft models being different models from the target aircraft;

the computer system executing instructions to search the local database to retrieve historical information related to one or more flight routes for the target flight with respect to the target aircraft from the database;

the computer system executing instructions to search the local database to retrieve historical information related to additional flight routes for the target flight with respect to each one of the different aircraft models from the database;

said computer system executing instructions to execute a calculation algorithm for calculating derived flight information using said specific or proposed flight information, said retrieved aircraft information, and said retrieved historical information for the target aircraft and also for the one or more different aircraft models, wherein said derived flight information includes information comparing an estimated flight time for the target aircraft with estimated flight times for the one or more different aircraft models;

said computer system executing instructions using said derived flight information to generate a time table and a graphical map graphically showing a particular flight path over the geographical map wherein said time table displays flight times for said particular flight path; and using at least one computer of said computer system to automatically generate a report utilizing said derived information, wherein said report is output by said computer system providing the compared estimates of the flight times in a visual form for viewing by a client, wherein said visual form includes the time table showing the flight times for the particular flight path and a graphic showing the particular flight path on the geographical map.

2. The method of claim 1, further comprising the step of reconciling said derived information with reported and/or projected flight information about the flight to identify discrepancies, and wherein said report includes information about said discrepancies.

3. The method of claim 2, wherein said reconciling includes comparing reported flight information including actual flight log information about the flight to derived information for validating or invalidating said flight log information.

4. The method of claim 2, wherein said specific or proposed flight information includes information about a source, a destination, and a date of the flight, and wherein said reported or projected flight information includes reported information about the flight of the particular aircraft, and wherein said derived information includes derived information about the flight of the particular aircraft, whereby said report includes information about discrepancies between them.

5. The method of claim 1, wherein said derived flight information includes information determining one or more specific geographic locations of the particular aircraft during the flight, and wherein said derived information also includes derivations of one or more durations of the aircraft within each one of said one or more specific geographic locations.

6. The method of claim 5, further comprising the step of determining one or more taxes owed based on said specific geographic locations and said durations.

7. The method of claim 1, wherein said derived flight information includes information about usage trends, such that said report includes information about said usage trends and about an adequacy of the aircraft supporting said usage trends.

8. The method of claim 1, wherein at least one of said first or second website are remotely located from said computer system such that said one of said first or second website are connected to said computer system via a public communication network.

9. The method of claim 1, further comprising the step of storing said derived flight information and/or said specific or proposed flight information for a plurality of applications of said method for collecting historical flight information.

10. The method of claim 9, further comprising the step of using said historical flight information for training.

11. The method of claim 9, further comprising the step of using said historical flight information for generating a report including a comparison of aircraft performance.

12. The method of claim 9, further comprising the step of using said historical flight information for identifying aircraft usage patterns or variations thereof.

13. The method of claim 9, further comprising the step of determining industry trends from said historical flight information.

14. The method of claim 13, further comprising the step of using said industry trends for developing or improving one or more products.

15. The method of claim 1, further comprising the step of validating or invalidating compliance with procedural and/or regulatory requirements using said derived information.

16. The method of claim 1, wherein said calculating step includes using statistical analysis to determine said derived flight information.

17. The method of claim 1, wherein said report is provided as an electronic presentation of information to the user via the user interface.

18. The method of claim 17, wherein said computer system includes a web server for serving said electronic presentation for display using a web browser.

19. The method of claim 1, wherein said report further includes information used to confirm enplanements.

20. The method of claim 19, wherein said report further includes information regarding said enplanements with respect to one or more particular airports.

21. The method of claim 1, wherein said report identifies non-destination stops.

22. The method of claim 1, wherein said report identifies limitations of the aircraft.

23. The method of claim 1, further comprising the step of developing proposed flight procedures for including in the report.

24. The method of claim 1, further comprising the step of forecasting market activities, industry trends, or transactions for including in the report.

25. The method of claim 1, further comprising the step of adapting the report for supporting legal and/or regulatory proceedings.

26. The method of claim 1, further comprising the step of determining aircraft usage trends for including in said report.

27. The method of claim 26, further comprising the step of providing suggested aircraft for meeting said usage trends.

28. A method of using a computer system comprising at least one computer and a database for verifying aircraft flight information, said method comprising the steps of:
storing historical information about a plurality of different flight routes for a plurality of different models of aircraft in a local database;
connecting the computer system to each one of a plurality of different external computer systems via a communication network;
the computer system executing instructions to obtain aircraft information about each one of the plurality of different models of aircraft, said aircraft information including aircraft size and performance information that is received electronically from a respective database of the external computer system of the respective manufacturer of each model of aircraft;
the computer system executing instructions to store said aircraft information in the local database;
the computer system executing instructions to provide a user interface with a display to display information to the user and having an input interface to said computer system to accept specific or proposed flight information about a target flight from a user;
the computer system executing instructions to accept the reported and/or projected flight information about the target flight;
selecting a target aircraft of a particular model from the plurality of different models of aircraft to evaluate the target flight;
the computer system executing instructions to search the local database to retrieve historical information related to the specific or proposed flight from the local database;
the computer system executing instructions to search the local database to retrieve aircraft information about the target aircraft from the local database;
the computer system executing instructions to search the local database to retrieve respective aircraft information about one or more different aircraft models from the local database, said one or more different aircraft models being different models from the target aircraft;
the computer system executing instructions to calculate derived flight information using said specific or proposed flight information and said aircraft information;
the computer system executing instructions to reconcile said derived information with said reported and/or projected flight information about the target flight to identify discrepancies, and wherein said report includes information about said discrepancies including information comparing the target aircraft to one or more of the said one or more different aircraft models;
said computer system executing instructions using said derived flight information to generate a time table and a graphical map graphically showing a particular flight path over the geographical map wherein said time table displays flight times for said particular flight path; and
using at least one computer of said computer system to automatically generate a report utilizing said derived information, wherein said report is output by said computer system providing the compared estimates of the flight times in a visual form for viewing by a client, wherein said visual form includes the time table showing the flight times for the particular flight path and a graphic showing the particular flight path on the geographical map.

29. A method of using a computer system for verifying aircraft flight information, said method comprising the steps of:
storing historical information about a plurality of different flight routes for a plurality of different models of aircraft in a local database;
connecting the computer system to each one of a plurality of different external computer systems via a communication network;
the computer system executing instructions to obtain aircraft information about each one of the plurality of different models of aircraft, said aircraft information including aircraft size and performance information that is received electronically from a respective database of the external computer system of the respective manufacturer of each model of aircraft;
the computer system executing instructions to store said aircraft information in the local database;
the computer system executing instructions to provide a user interface with a display to display information to the user and having an input interface to said computer system to accept specific or proposed flight information about a target flight from a user;
selecting a target aircraft of a particular model from the plurality of different models of aircraft to evaluate the target flight;
the computer system executing instructions to accept the flight information about the target flight;
the computer system executing instructions to search the local database to retrieve historical information related to the flight route from the local database;
at least one computer of the computer system executing instructions to search the local database to retrieve aircraft information about the target aircraft from the local database;
the computer system executing instructions to search the local database to retrieve aircraft information about the target aircraft from the local database;
the computer system executing instructions to search the local database to retrieve respective aircraft information about one or more different aircraft models from the local database, said one or more different aircraft models being different models from the target aircraft;

the computer system executing instructions to calculate derived flight information using said specific or proposed flight information, said historical information, and said retrieved aircraft information of both the target aircraft and the one or more different aircraft models, wherein said derived flight information includes information comparing an estimated flight time for the target aircraft and at least one of the one or more different aircraft models;

said computer system executing instructions using said derived flight information to generate a time table and a graphical map graphically showing a particular flight path over the geographical map wherein said time table displays flight times for said particular flight path; and using at least one computer of said computer system to automatically generate a report utilizing said derived information for comparing with said reported and/or projected flight information, wherein said report is output by said computer system providing the compared estimates of the flight times in a visual form for viewing by a client, wherein said visual form includes the time table showing the flight times for the particular flight path and a graphic showing the particular flight path on the geographical map.

* * * * *